US006997654B2

(12) United States Patent
Blick

(10) Patent No.: US 6,997,654 B2
(45) Date of Patent: Feb. 14, 2006

(54) TAPPING TOOL FOR USE WITH DRILL PRESS

(76) Inventor: John Blick, 31891 Circle Dr., S. Laguna, CA (US) 92677

( * ) Notice: Subject to any disclaimer, the term of this patent is extended or adjusted under 35 U.S.C. 154(b) by 54 days.

(21) Appl. No.: 10/647,736

(22) Filed: Aug. 20, 2003

(65) Prior Publication Data

US 2005/0042045 A1 Feb. 24, 2005

(51) Int. Cl.
*B23B 45/12* (2006.01)
*B23G 1/00* (2006.01)
(52) U.S. Cl. ............... 408/121; 408/123; 470/207
(58) Field of Classification Search ........... 408/120, 408/121, 122, 122.5, 123, 127, 239 R; 279/143, 279/145, 16; 470/198, 207
See application file for complete search history.

(56) References Cited

U.S. PATENT DOCUMENTS

| | | | | |
|---|---|---|---|---|
| 1,506,331 A | * | 8/1924 | Benko ............... 408/140 |
| 2,141,465 A | * | 12/1938 | Grey ............... 408/135 |
| 2,325,184 A | * | 7/1943 | Jampoler ............... 408/139 |
| 3,306,639 A | * | 2/1967 | Lyon ............... 403/107 |
| 3,364,510 A | * | 1/1968 | Johnson ............... 408/123 |
| 3,506,277 A | * | 4/1970 | Harms ............... 279/63 |
| 3,587,124 A | * | 6/1971 | Cox et al. ............... 470/103 |
| 3,653,780 A | * | 4/1972 | Ammatuna ............... 408/241 R |
| 4,087,195 A | * | 5/1978 | Wood ............... 408/240 |
| 4,090,802 A | * | 5/1978 | Bilz ............... 408/6 |
| 4,687,384 A | * | 8/1987 | McCoy ............... 408/10 |
| 4,702,131 A | * | 10/1987 | Snow ............... 81/177.5 |
| 4,750,750 A | * | 6/1988 | Batalorf, Jr. ............... 279/144 |
| 4,799,832 A | * | 1/1989 | Abbott ............... 408/123 |
| 4,815,347 A | * | 3/1989 | Rogers ............... 82/153 |
| 4,818,158 A | * | 4/1989 | Munroe ............... 408/241 R |
| 4,988,243 A | * | 1/1991 | Proffitt ............... 408/241 R |
| 5,025,548 A | * | 6/1991 | Justesen ............... 29/560 |
| 5,168,782 A | * | 12/1992 | Cromwell ............... 81/177.2 |
| 5,282,638 A | * | 2/1994 | Harper ............... 279/144 |
| 5,676,028 A | * | 10/1997 | Jordan ............... 81/177.2 |
| 5,800,102 A | * | 9/1998 | Taber ............... 408/241 R |
| 6,019,019 A | * | 2/2000 | Hobbs ............... 81/177.2 |

* cited by examiner

*Primary Examiner*—Boyer D. Ashley
*Assistant Examiner*—Ali Abdelwahed
(74) *Attorney, Agent, or Firm*—Curtis L. Harrington

(57) ABSTRACT

A tapping device is configured to be used within a drill press or lathe or other device capable of holding a cylindrical object. The tapping device has an upper projection for being axially fixed in, for example, a drill press. The remainder of the body of the tapping device is rotatable with respect to the upper projection and includes side handles for providing handy mechanical advantage to the turning of the tapping device body. The end of the body opposite the upper projection includes a chuck for holding a typical tapping tool. The projection is connected to an internal shaft which engages the body of the tapping tool and is spring biased to draw the projection and internal shaft within the body of the tapping tool. Conversely, when the tapping tool is supported in, as an example, a drill press chuck, such spring urging acts to lift the body of the tapping tool in the direction of the projection. The number and nature of the springs which act between the internal shaft and the body of the tapping tool, as well as the dimensions noted can be widely varied to accommodate a variety of force versus displacement characteristics especially taking into account the mass of both the body of the tapping tool and its tap chuck. An adapter is provided for quick change of socket supported taps.

12 Claims, 7 Drawing Sheets

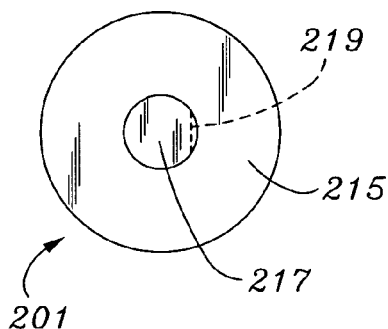
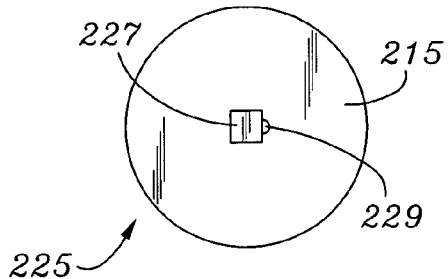
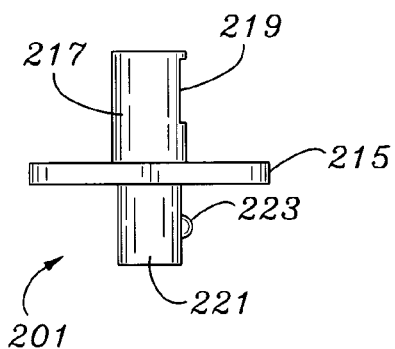
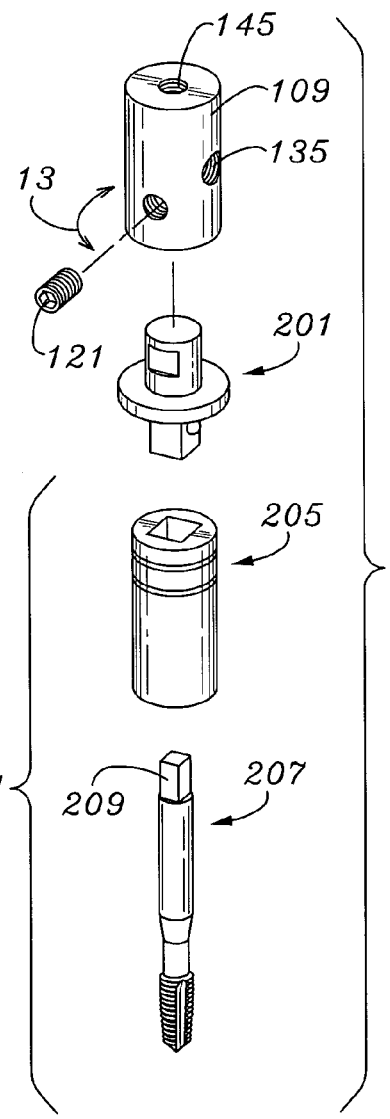
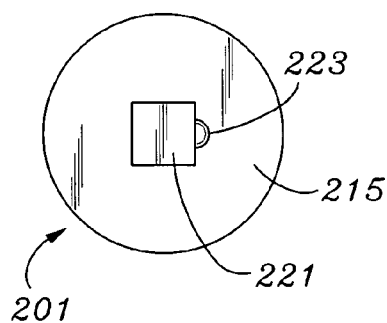

TAPPING TOOL FOR USE WITH DRILL PRESS

FIELD OF THE INVENTION

The present invention relates to improvements the field of tapping devices. More specifically, the present invention relates to a tapping device for use in a rotary operated machine such as a drill press, milling machine or lathe, along with a method which permits a cleaner, more controlled hand powered tap method, and which permits a more automatically controlled lifting force upon tap removal so as to better insure and preserve the threads of the tap nearest the tap opening.

BACKGROUND OF THE INVENTION

The many different types and numbers of tapping tools on the market reflect designs in which the designers pursued different goals which are served by the designs. For some goals, the resulting design dictates a device which suffers in other areas. Those other areas can include high cost, lack of ease of use, excessive work space requirements, and other disadvantages.

Setting aside automated, highly specific dedicated machine tappers, as well as other large tapping dedicated devices, the devices which have developed for short run shop tapping have a definite historical progression. In the simplest form, a manual chuck with "T" shaped handles would be used to carefully align with a bore with the user manually using both hands and a sharp eye to both manually align and manually turn the tap.

A further improvement included the inclusion of a pin at the center of the tapping tool so that it could be used with a machine spindle in order to derive alignment. However, beginning the step of turning of the tap with advancement of the tap into the bore either caused the tap to lose its guiding connection with an axially non-moveable spindle, or required some other action by the user in operating a different mechanism to try and move the spindle.

As a variation on this configuration, a guide which provided a close tolerance bore for movement of the pin was attached to the spindle to give alignment, but which allows the advance of the tapping tool with respect to the guide. However, the starting of the tapping process caused the tapping device pin to move down and eventually out of the bore, resulting in loss of alignment.

A further variation is illustrated in U.S. Pat. No. 4,087,195 to James R. Wood, entitled "TAPPING ACCESSORY", incorporated by reference herein, which utilizes a telescoping sleeve and post arrangement. A rod insert is fixed in a chuck in the same manner as a drill bit would be fixed. The tapping tool has a guide bore which is engaged by the rod insert as the tapping tool is axially moved onto the rod insert and upward toward the chuck.

The shortcomings of this arrangement are several. First, the axial length of the bore in the tapping tool and the insert may prohibit ease of removal of the tapping tool from the insert in order to easily change the tap. Changing the tap with the device of Woods while in place over the insert would involve one hand to lift upwardly on the tapping device while the other hand is used to loosen the tap chuck. A "third hand" is needed to retrieve the tap and load in a new one. As a result the device of Woods either disassembles or requires breaking the work piece setup each time a change of tap is needed.

Second, the device of Wood requires one hand to hold the tapping device upward and clear of the work piece while the work piece is being positioned. If the working table requires two hands to move the work piece into position, a third hand is again needed. Without the upward force on the device of Wood, the tapping device would freely slide down the rod insert and impact or scratch across the work piece.

Third, because of unsteadiness and the need for a third hand in positioning the work piece, the device of Wood naturally causes the user to operate with significant clearance over a work piece to avoid inadvertent contact between the tap and the work piece during pre-tap positioning. This over clearance results in a significant portion of the length of telescoping travel to be utilized as clearance to make up for the ungainliness involved in work piece change. This can cause the premature loss of guidance where the tapping device of Wood begins from a position too far down the rod insert.

Fourth, when the tapping tool of Wood is backed out of the tapped hole, a manual user may have a tendency to spin the tap at its point of departure from the now threaded bore to potentially damage the threads nearest the threaded bore opening.

Fifth, in terms of general use, the device of Wood is a disassembled two piece affair. It has to be disassembled and re-assembled each time it is used. The rod insert is loaded into the drill chuck, followed by loading the tapping tool onto the rod insert, and then holding the tapping tool upwardly in place while having to adjust both the work piece alignment and possibly the height of the drill chuck if it is adjustable. Otherwise, the user must guess the proper height of the drill chuck before the rod insert is loaded.

What is needed is a device which overcomes limitations of the Wood tapping device and which eliminates the need for a third hand to both support a tapping device while positioning the work piece; eliminates the need to guess the proper separation between the work piece and the drill chuck; eliminates the two piece assembly, disassembly and stepwise assembly actions required with a telescoping rod insert free from its associated guide socket; facilitates two handed change of taps without having to disassemble the tapping tool; and prevents inadvertent action at the tap opening upon backing out of the tap from the threaded bore.

SUMMARY OF THE INVENTION

A tapping device is provided as an integral guided spindle tapper with spring return which is easily used in a drill press, milling machine, lathe or similar rotary powered machine typically employing a chucking device for the axial mounting of tools. The tapping device herein is utilized while such machines are in the un-powered state, taking advantage of the axial alignment and adjustability to accommodate a wide size variety of parts. An internal spring return allows for easy management of the tapping components during the tapping process and provides for axial retraction of the tap and tapping device from the tapped hole or bore to a position above and free from the part, an advantage usually not had outside of dedicated tapping stands having counter weights.

The ability of this tapping device to be used in a drill press allows the tapping device to take advantage of the axial adjustability available in axially adjustable quills and height adjustable tables of a typical drill press to allow for a far greater variety of size of parts to be tapped than available in a table top, tapper dedicated, fixed stand. Further, the tapper can be used in the field with any sort of guiding stable structure, which opens the possibility of performing very large to quite small size taps which can be performed anywhere. The moveable table of the drill press or similar machine, or the tail stock of a lathe enables the new tapping device herein far greater flexibility than is available conventionally.

The tapping device herein is configured to be used within a non-powered drill press or lathe or other device capable of holding a cylindrical object or extension being capable of being axially centered generally, and is to be powered by hand only. The tapping device has an upper projection for being axially fixed in, for example, a drill press. The drill press example is used because of its greater incidence in use and what is believed to be a greater simplicity of use from a vertical standpoint. The remainder of the body of the tapping device is rotatable with respect to the upper projection and includes side handles for providing handy mechanical advantage to the turning of the tapping device body. The end of the tapping device body opposite the upper projection includes a chuck or other adapter to facilitate the holding of a typical tapping tool.

The projection is connected to an internal shaft which engages the body of the tapping tool and is spring biased to draw the projection and internal shaft within the body of the tapping tool. Conversely, when the tapping tool is supported in, as an example, a drill press chuck, such spring urging acts to lift the body of the tapping tool in the direction of the projection. The number and nature of the springs which act between the internal shaft and the body of the tapping tool, as well as the dimensions noted can be widely varied to accommodate a variety of force versus displacement characteristics especially taking into account the mass of both the body of the tapping tool and its tap chuck. The tapping tool disclosed offers advantages in both guidance, alignment, and in disengagement from a just-tapped bore to minimize damage to the outermost threads of the just-threaded bore. The advantages of the tapper of the invention herein include (1) one piece unitized body for quick and easy utilization; (2) a return spring which not only prevents damage to tapped holes but holds the tapper in its upward most position to facilitate change of work piece; (3) a stroke length which insures adequate length for maintaining guidance throughout the full extent of tap travel; (4) a more "hands free" level of operation is enabled by facilitating the user's concentration on work piece alignment, starting the tap, and tap back out, all in a more controlled manner; (5) enhanced adjustability and part size accommodation; and (6) easy deployment and small space taken up upon storage.

BRIEF DESCRIPTION OF THE DRAWINGS

The invention, its configuration, construction, and operation will be best further described in the following detailed description, taken in conjunction with the accompanying drawings in which:

FIG. 8 illustrates an option which is utilizable with the tapping tool of the invention as a socket tapper and adapter;

FIG. 9 is an expanded isolated view of the adapter seen in FIG. 8 having a proportion typically seen for a one quarter inch socket size;

FIG. 10 is a bottom view of the adapter seen in FIGS. 9 and 10;

FIG. 11 is a top view of the adapter seen in FIGS. 8, 9 and 10;

FIG. 12 is a bottom view of an adapter having a proportion consistent with a one eighth inch socket size.

DETAILED DESCRIPTION OF THE PREFERRED EMBODIMENT

Figure 1:
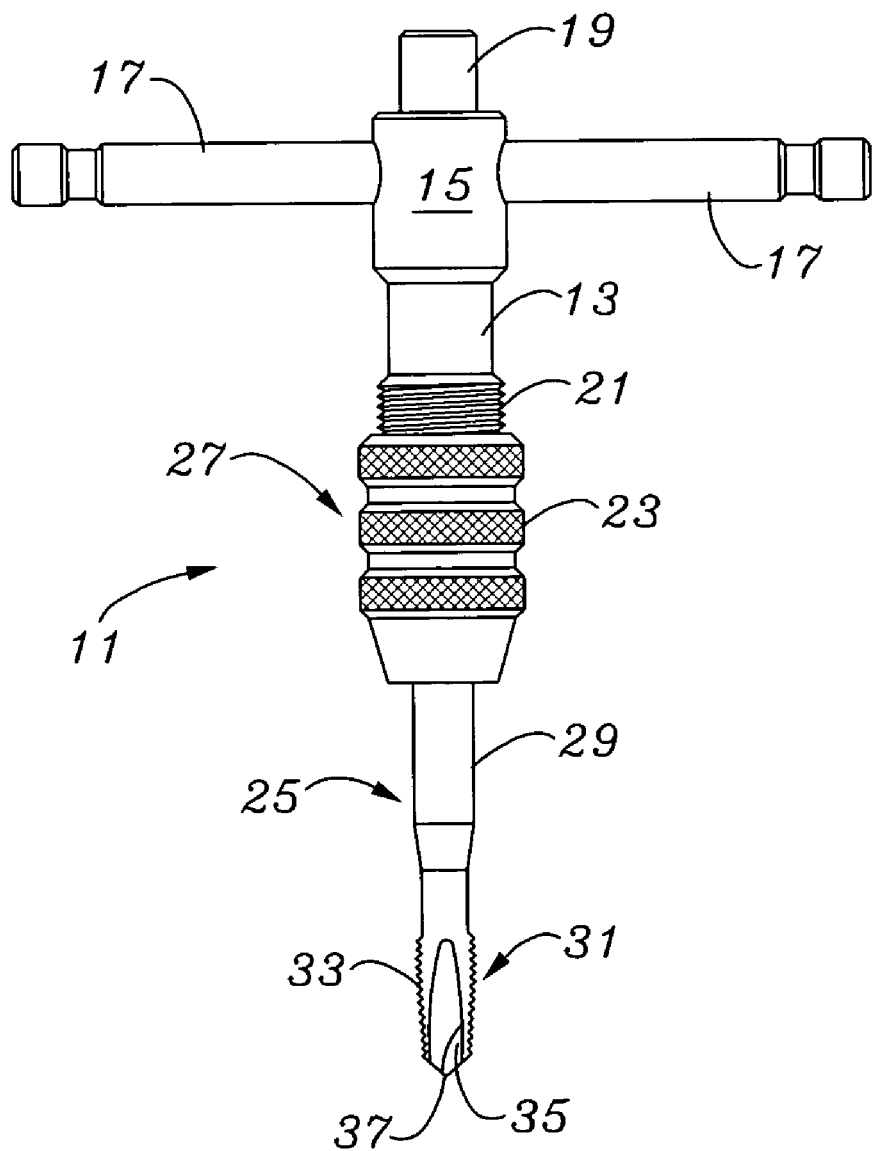
FIG. 1 is a prior art drawing showing a typical hand tapping device having a pair of arms and a tap chuck holding a tap.

The description and operation of the invention will be best described with reference to prior art FIG. 1, which is a perspective view of a typical conventional hand tapper 11. Conventional tapper 11 has a main body 13 having an upper fitting 15 supporting a pair of side extending turning arms 17. Conventional tapper 11 has an upper nib 19 which may be used for support. Below the main body 13 is a threaded section 21 which may, with manually turned collar 23, be included as a chuck for holding a tap 25 in a conventional manner. Tap 25 has an upper end (not shown) designed to fit within a typical tap chuck and may vary in its specific shape, generally so long as it can be engaged by a chuck type of securing mechanism. Within or at the threaded section 21 and the manually turned collar 23 are other mechanism portions which make up the tap chuck which is shown by an arrow and designated with the numeral 27.

Tap 25 has a shaft 29 and a cutting head 31 typically having several flanks of cutting threads 33 separated by gaps 35. A tip 37 on the tap 25 provides somewhat of a self centering tendency for the smooth bore over which it is placed, as will be shown. Where the hand tapper 11 is used without further supportive assistance, it is up to the operator to manually position the tip 37 over a drilled blind bore and to both start the tapping process by turning the tapper 11 while trying to keep the shaft 29 in line with the drilled blind bore. After the bore is tapped, the tapper 11 is reversed, but the operator has to be especially careful for the last few turns of the tapper's back-out process to insure that the tapper is not inadvertently angled to one side which could severely damage the threads nearest the entrance of the now tapped bore. The threads nearest the entrance of the tapped bore are critical to the process of beginning to engage the tapped bore with a bolt or threaded member. If the outermost threads are damaged, threading could be time consuming and problematic if not impossible. A bore badly enough damaged may require expensive re-tapping or cause it to be scrapped.

Figure 2:
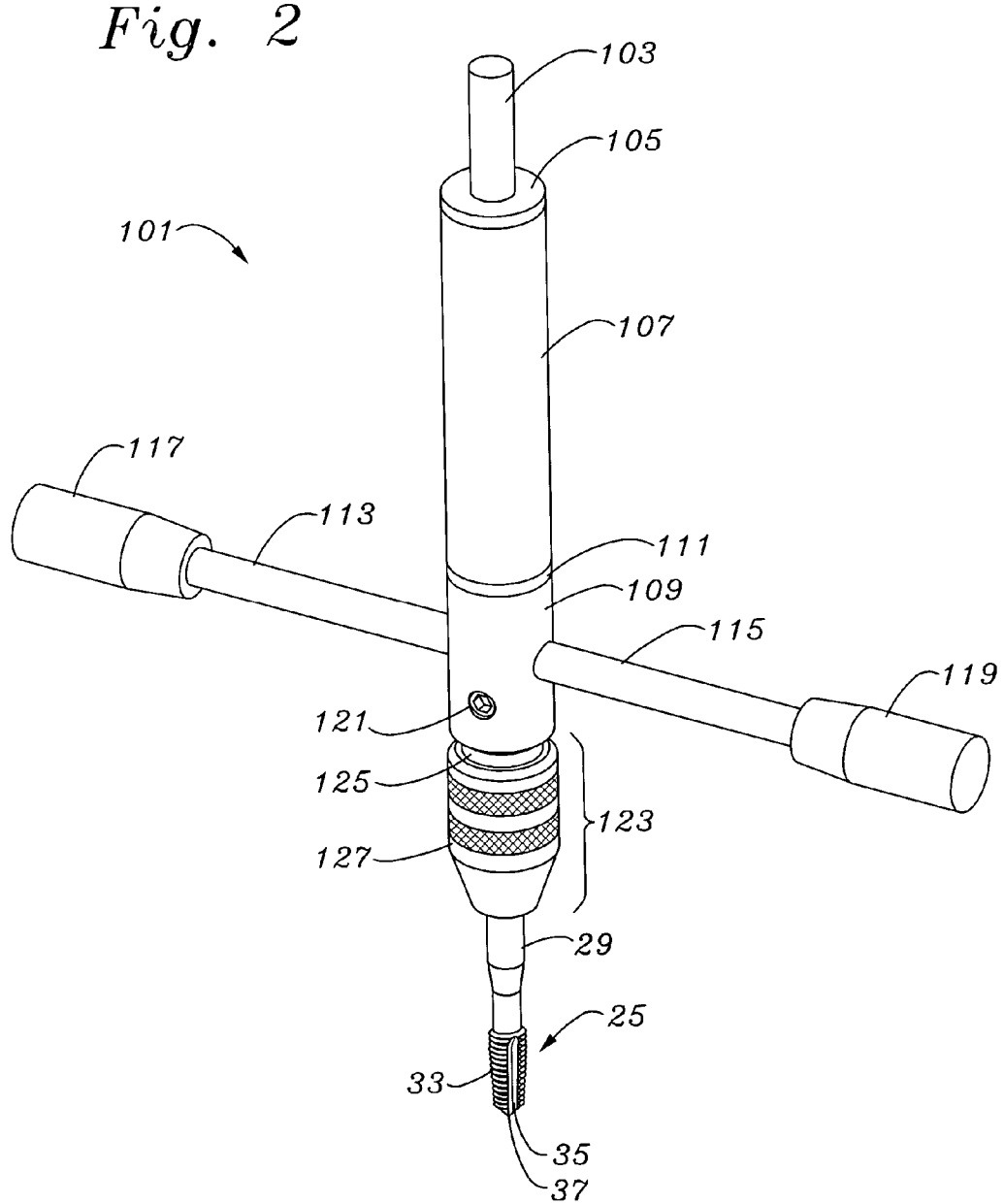
FIG. 2 is a perspective view of the tapping tool of the invention looking down from an upper viewing perspective.

Referring to FIG. 2 a perspective view of a tapping tool 101 of the invention looking down from an upper viewing perspective is seen. From the top, the features which may be seen are a small projection 103 extending above a base cap 105 connected into an upper body 107. Upper body 107 may be separated from a lower body 109 by a fitting 111 which will be shown to provide a spring stop function.

From the lower body 109, a pair of handles 113 and 115 extend in opposite directions. Handle 113 is fitted with a turning knob 117 at its end while handle 115 is fitted with a turning knob 119 at its end. Handles 113 and 115 are shown as being of equal length with turning knobs 117 and 119 being also equal, but this need not be the case. The two handles can be of unequal lengths while of equal weight or of equal moment with respect to the lower body 109. Combination handle 113 and turning knob 117 which is weight balanced, and evenly weight loaded with respect to turning handle 115 and turning knob 119 can serve a higher utility of allowing the lower body 109 to execute a kinetic energy spin by an operator for the back-out or tap removal step, as will be shown.

Lower body 109 is shown as having a locking threaded member 121 for securing the members shown below the lower body 109 which may be referred to as a tap chuck 123 which includes a body 125 carrying threads (not shown) which are engaged by a manually turned collar 127. A conventional tap 25 is seen as being engaged by the tap chuck 123. Again, the conventional tap has the same elements referred to in FIG. 1. As will be shown, the lower body 109 is urged toward the upper body 107 to provide an automatic lifting force to enable the conventional tap 25 to evenly, gently and cleanly clear a tapped bore into which it has just operated.

Figure 3:
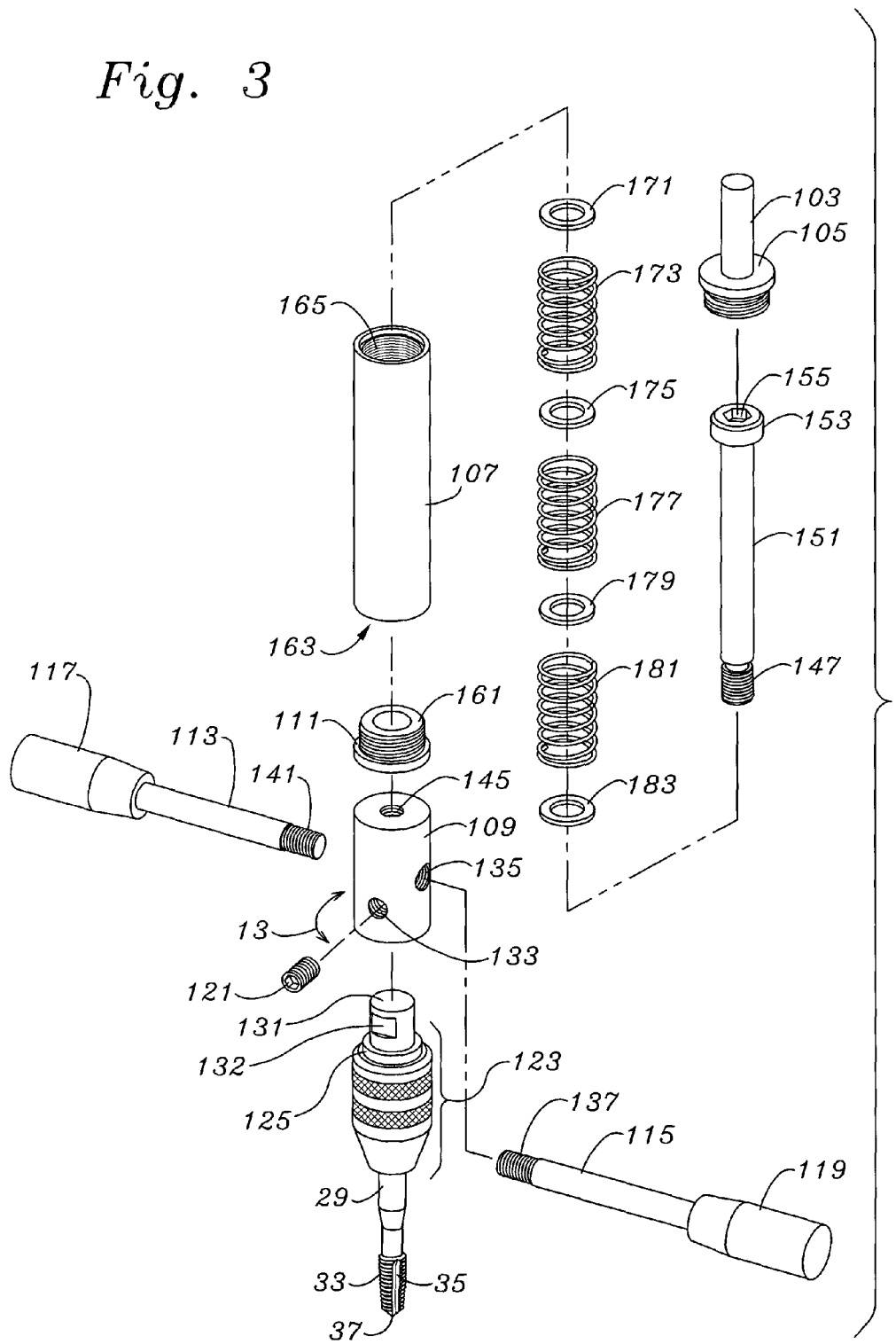
FIG. 3 is an exploded view of the tapping tool of FIG. 2 and illustrating the internal components thereof.

Referring to FIG. 3, an exploded view of the tapping tool of FIG. 2 illustrates the internal components thereof to facilitate further discussion. The body 125 can be seen to lead to an upper projection 131 which fits into the bottom of the lower body 109 to be secured by the locking threaded member 121 which is seen to be a hex screw. Upper projection 131 has a flat portion 132 for engaging the locking threaded member 121 for both rotational and axial fixation. The members below the body 125 are not further exploded.

The lower body 109 is seen to be cylindrical in shape with a series of threaded openings. A first threaded opening 133 accommodates the threaded member 121. A first threaded handle opening 135 accommodates a threaded end 137 of the handle 115. Similarly a second threaded handle opening 135 (arrow pointing around the left side of the lower body 109) accommodates a threaded end 141 of the handle 113.

Lower body 109 has a center threaded bore 145 for engaging a threaded end 147 of a shoulder bolt 149 having a smooth shaft 151 terminating at an expanded head 153 opposite the threaded end 147. Expanded head 153 is seen as having a hexagonal opening 155 to enable it to be more easily manipulated through and into the tubular upper body 107.

Returning to a position just above the lower body 109, fitting 111 can be seen to have an upper threaded member 161 which fits into an internal threaded lower portion 163 (indicated by arrow) of the tubular upper body 107. The fitting 111 forms a restricted opening at the bottom of the upper threaded member 161 to form a bottom restraint on springs within. The top of the tubular upper body 107 is seen to have an internal threaded upper portion 165, which is generally of the same type and nature as the threaded lower portion 163.

Above the internal threaded upper portion 165 a washer 171 is seen adjacent a first spring 173 which is adjacent a washer 175 adjacent a second spring 177 which is adjacent a washer 179 which is adjacent a third spring 181 which is adjacent a washer 183. The serial assembly of washer 171, first spring 173, washer 175, second spring 177, washer 179, third spring 181, and washer 183 could be replaced by a pair of washers and a single spring in between. The three springs 173, 177, 181 were used in this case to average the initial force and to insure that weakening will not occur based upon the springs used. However, individually selected single springs can have characteristics which can match multiple spring force and displacement loading.

Above the shoulder bolt 149 is the projection and base cap 105 previously seen. Base cap 105 has a downwardly projecting thread member 191 which engages the internal threaded upper portion 165 of the upper body 107. As can thus be seen, the base cap 105 and projection 103 engage and hold the upper body 107 only against the downward force applied through the springs 173, 175 & 181 through downward movement of the shoulder bolt 149.

In terms of force, it can be seen that if small projection 103 were anchored, and that if both the fittings 111 and base cap 105 were firmly tightened into the upper body 107, that rotation of the lower body 109 would occur with simultaneous rotation of the shoulder bolt 149 with slippage and turning friction occurring from the expanded head 153, through multiple members including washer 183, spring 181, washer 179, spring 177, washer 175, spring 173, washer 171 and finally fitting 111. With such an expanded number of surfaces through which the bearing force is so widely distributed, turning of lower body 109 with respect to upper body 107 occurs quite freely. Further, lubrication may be applied to the members within upper body 107 to further facilitate free rotational movement of the lower body 109 with respect to the upper body 107. Free rotation will continue throughout the range of compression of the springs 173, 177, and 181.

Figure 4:
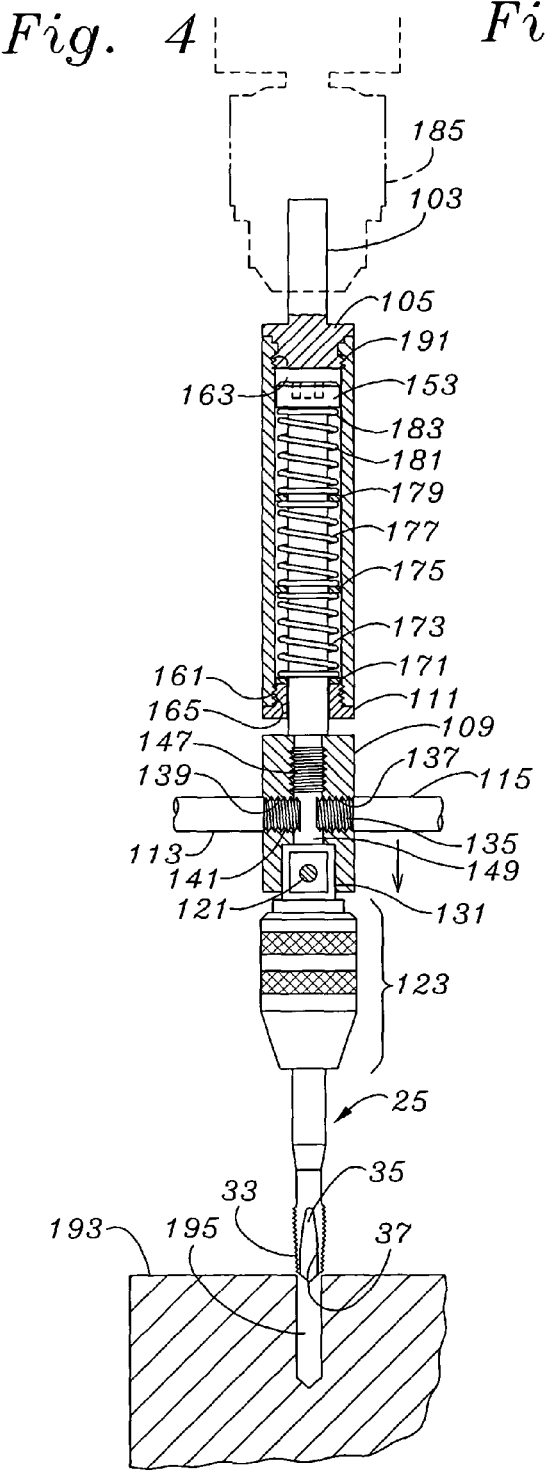
FIG. 4 is a sectional side view of the tapping tool held by a drill press chuck shown in phantom, and showing a tap in its tap chuck and shown at the initial point of engagement over a work piece with smooth sided bore.

Referring to FIG. 4, a sectional side view of the assembled tapping tool is seen. The small projection 103 is held in place by a conventional drill press chuck 185 shown in phantom. The tap chuck 123 has a tap 25 in place and the tapping tool 101 is seen held in vertical place over a volume of material 193 having a smooth bore 195 to be tapped. Note the small gap between the fitting 111 and the top of the lower body 109. This represents a condition which occurs just before the actual tapping begins.

The preparation steps involve the use of a conventional drill press which is highly likely to be found as a fundamental tool in the shop setting. The one piece tapping tool 101, by utilizing device such as a conventional drill press likely already in place in the shop environment, significant cost, ease of use and storage space.

Once a volume of material 101 having a smooth bore 195 to be tapped is centered below the conventional drill press, the tapping tool 101 is locked into drill chuck 185 in the same manner in which a cylindrical drill bit would be locked int drill chuck 185. Many drill presses have a handle for lowering and raising the drill chuck 185, while others may have other controls for raising and lowering the work surface upon which the volume of material 193 having a smooth bore 195 may rest. In any event, once the tapping tool 101 has its small projection 103 securely locked within the drill chuck 185, the level of the drill chuck 185 and therefore the tapping tool 101 with respect to the top surface of the volume of material 193 should be adjusted so that the tip 37 is perhaps from an eighth or a quarter inch to about an inch or two above the opening of the opening of the smooth bore 195, and centered over the smooth bore 195. Once the position is achieved, the distance between the drill chuck 185 and the volume of material 193 is locked in place either by locking the height of the drill chuck 185 or locking the other controls for moving or raising and lowering the volume of material 193.

The operator then grasps the handles 113 and 115 to bring the lower body 109 down and apart from the upper body 107 by overcoming the lifting force of the springs 173, 177, 181 to the point that the tip 37 of the tap 25 is within the opening of the smooth bore 195. While maintaining only slight downward pressure only as necessary to overcome the lifting force of the springs 173, 177, 181 the operator begins turning the handles 113 and 115 to start the tap 25 within the smooth bore 195 in order to get it started. This is the position closest to that seen in FIG. 4.

Alignment is also assured if the hole is aligned with the drill bit which was used to drill the bore 195, assuming that the work piece is clamped into place. Otherwise, if the part is allowed to "float" beneath the tapper in a position perpendicular to the bore 195 opening, tapping tool 101 tap 25 will "self align" as the tap 25 finds the center of the bore 195. In either of these cases the operator is assured of a straight run in. Further, it takes only slight pressure to bring the tap 25 down to the bore 195, and alignment can be further visually ascertained.

Figure 5:
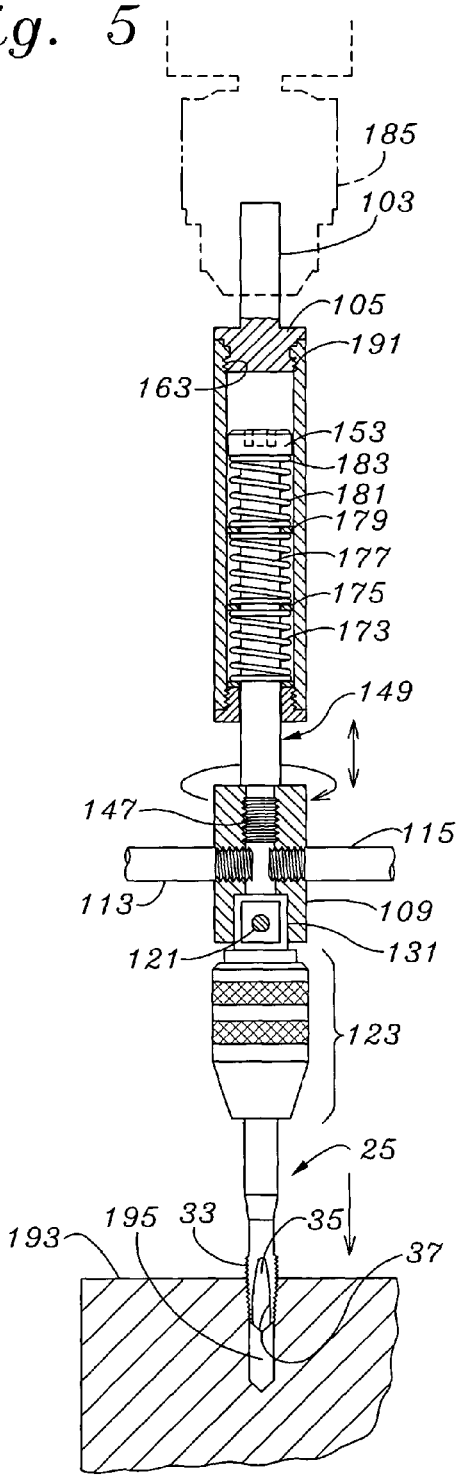
FIG. 5 illustrates a further change in orientation after the steps of FIG. 4 and in which the tap is being cut while the main shaft of the tapping tool is displaced downwardly in the body against the springs as tap continues to be formed.

Referring to FIG. 5, as the handles 113 and 115 continue to be turned, the tap 25 continues its threading operation within the now half threaded bore 195. As threading continues, the lower housing 109 continues to turn and travel downward at a rate in accord with the pitch of the threads being formed.

Figure 6:
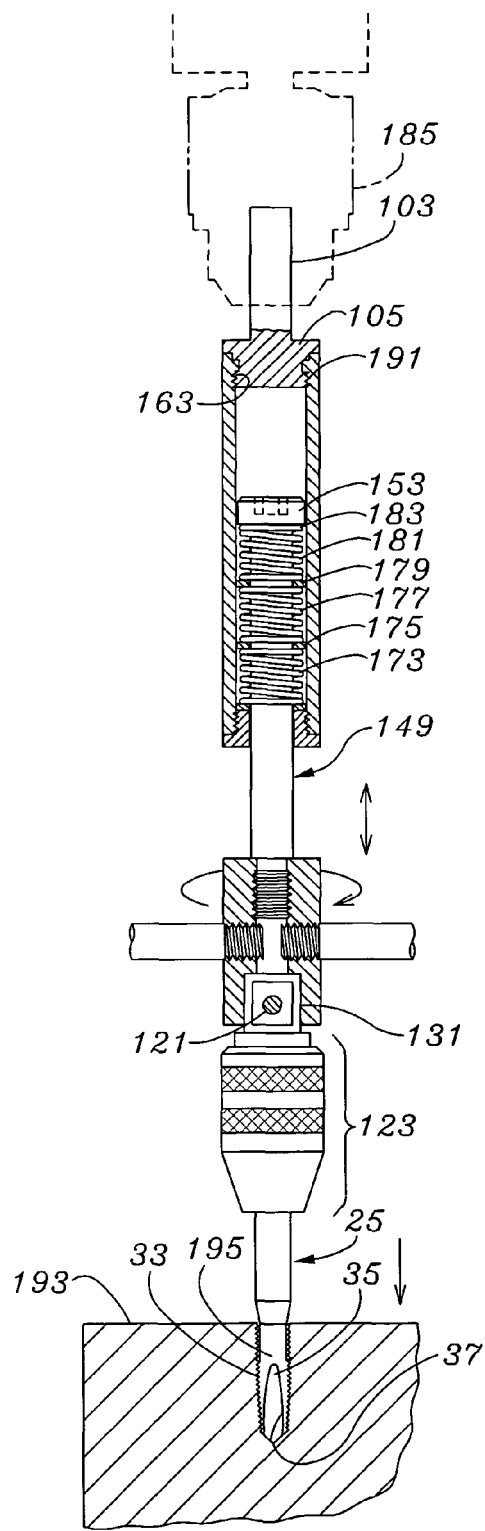
FIG. 6 shows the tap run into the bore its maximum extent and producing compression of the springs.

Referring to FIG. 6, a view of the tap having been run completely into the bore its maximum extent is shown.

Figure 7:
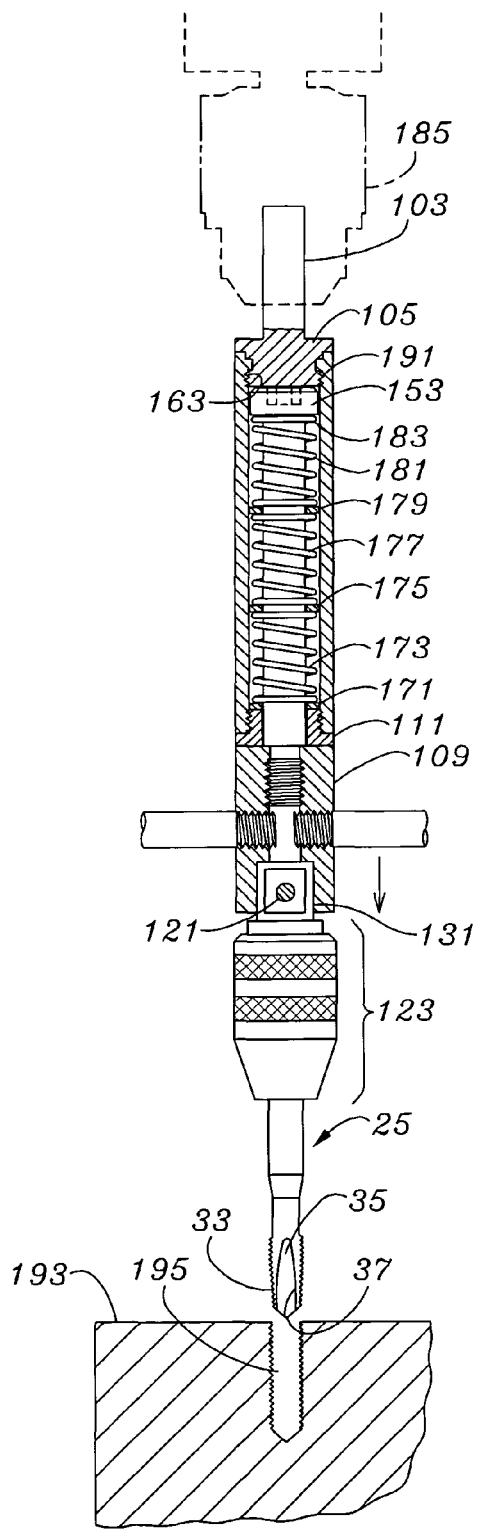
FIG. 7 shows the tapping tool being reversed in direction to back out of the tapped bore and after it has cleared the tapped bore being brought upward from the work piece by the same amount as the starting height in FIG. 4.

Referring to FIG. 7, a view of the tapping tool being reversed in direction to back out of the tapped bore and after it has cleared the tapped bore being brought upward from the work piece by the same amount as the starting height just before being brought down into initial contact with the bore 195 as is seen in FIG. 4. A substantial savings in time is saved by performing the backing out operation of FIG. 7. The handles 113 and 115 can be spun rapidly to automatically back out the tap 25 from the now tapped bore 195 to be lifted upwardly automatically as soon as the tap 25 clears the last tapped thread. The space below the tapping tool 101 is now out of the way and ready for the next volume of material 193 to be tapped.

The savings in time and space obtainable by using the tapping tool 101 can be augmented by the addition of an adapter in lieu of tap chuck 123. In U.S. Pat. No. 5,213,347 to Richard E. Rulon, entitled "SOCKET DRIVEABLE TAP APPARATUS", which is incorporated by reference herein, a tool socket was modified to accept a tap having a square rear support end. The result of the innovation in this reference is to enable taps to be utilized with a conventional socket driver to thus enable a set of taps, each having their own support socket, to be quick-changed onto a driver.

Referring to FIG. 8, a perspective exploded view of a section identified as section 8—8 in FIG. 1 is seen with the tap chuck 123 being replaced by a combination of an adapter 201 set to support a socket 205. Socket 205 supports a tap 207. Tap 207 is seen as having a square end 209. The illustration of the system of the U.S. Pat. No. 5,213,347 reference patent is but one example of a facilitating adapter. Other more specialized and complex adapters are possible, as for example a posi-drive quick change adapter commercially available from Jacobs Chuck/Bilz Company of Clemson, S.C. It is thus anticipated that other quick-change adapter systems are under development or will be developed in future.

Returning to FIG. 8, further details of the fixation of tap 207 into socket 205 will be omitted, as it is expected that the user will have a variety of different sized tap and socket assemblies 211 from which to quickly attach to the adapter 201. The manner of attachment and retention of the tap and socket assembly 211 onto the adapter 201 is the same manner in which conventional wrench sockets are attached to conventional drivers.

Referring to FIG. 9, an expanded isolated view of the adapter 201 of FIG. 8 has a proportion typically seen for a one quarter inch socket size. The adapter 201 is preferably of one piece construction but need not be. Adapter 201 includes a central plate 215 generally indicated an upper portion including an upper projection 217 and a flat portion 219. The upper projection 217 is preferably not significantly different from the upper projection 131 of the tap chuck 123 seen in FIG. 3. The flat portion 219 fixes the adapter 201 both rotationally and axially.

Below the central plate 215 is a male socket projection member 221 having a spring loaded (spring and internals not shown) round projection 223 extending to one side. The flat portion 219 and round projection 223 are shown extending to the same side for orientation purposes to show all of the features, but the adapter 201 need not be so oriented in a production model.

FIG. 10 is a bottom view of the adapter 201 showing structure also seen in FIG. 9, and FIG. 11 is a top view of the adapter seen 201 also showing structure seen in FIG. 9.

FIG. 12 is a bottom view of an adapter 225 shown in a proportion consistent with a one eighth inch socket size, and including a smaller male socket projection member 227 having a smaller round projection 229.

Figure 13:
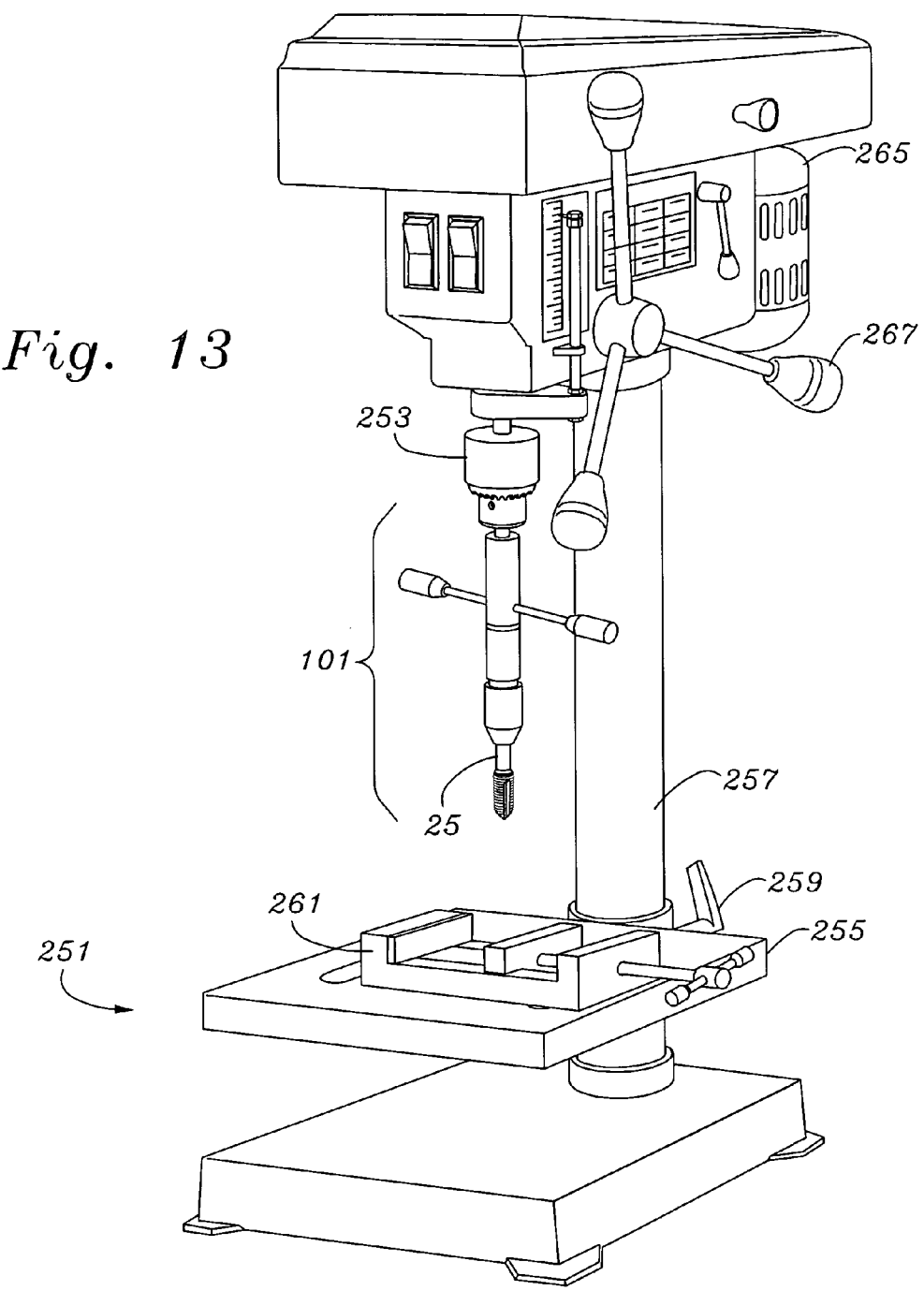
FIG. 13 is a perspective view of a drill press to facilitate an explanation of how the tapping device of the invention is utilized.

Referring to FIG. 13, a drill press 251 holds tapping tool 101 in its drill chuck 253. The tapping tool 101 holds a conventional tap 25. Drill press 251 has an adjustable height work table 255 which can be loosened for vertical movement along a column 257 by using a set screw handle 259. Some drill presses have different adjustment mechanisms such as a scissors jack table or other more sophisticated mechanism for raising and lowering the adjustable height work table 255. The current configuration is shown for clarity. The adjustable height work table 255 is shown as supporting a work table vice set 261 which is attached to the adjustable height work table 255 and enables a work piece to be positioned and rigidly held underneath the tapping tool 101.

It must be emphasized that in utilizing the tapping tool 101 that a motor 265 of the drill press 251 is to be completely shut off, and non-working throughout all of the steps for using the tapping tool 101. It should also be noted that a handle set 267 which is normally used to lower the quill and drill chuck 253 during drilling operations is similarly not used for other than setup dimensioning. The drill chuck 253 is used only as a vertical support and centering structure for the tapping tool 101, and the adjustable height work table 255 is used only to support the work piece volume of material 193 in a position underneath the conventional tap 25. In this manner, the tapping tool 101 enables an already existing piece of equipment, the drill press 251 to provide all of the advantages which would only be attainable by otherwise having a bulky specialized dedicated tapper instrument taking up valuable shop floor space. The tapping tool 101 takes up minimal space in a drawer of a tool chest when not in use.

In a drill press having a quill lock where the drill chuck 253 can be moved up and down and then locked into a position, this movement may be used in lieu of the up and down movement of the adjustable height work table 255 in order to place the tapping tool 101 into the position shown in FIG. 4. Once the position of FIG. 4 is achieved, all further movement will be manual only and will consist of downward movement of the handles 113 and 115 of the tapping tool 101.

After the tapping tool 101 is fixed within the drill chuck 253, the adjustable height work table 255, or the quill and drill chuck 253 is adjusted to a correct height so that a part held within the supporting vice set 261 is directly under the tapping tool 101, and so that the conventional tap 25 is directly over a smooth bore 195 within a volume of material 193 seen in FIG. 4. Once this position is achieved, manual tapping proceeds in accord with the above described procedures stated in conjunction with the descriptions of FIGS. 4–7.

While the present invention has been described in terms of a device and system used to supplant a full sized, high space occupancy tapping machine, and in particular replacing a tapping machine with a device which can be used with a conventional drill press, lathe or other existing tool or drill bit holding device, one of ordinary skill in the art can see that the device of the invention can be applied to many appliances and process tools. The present invention may be applied in any situation where the position of working tools are desired to be precisely located and automatically aligned at the outset of processing and automatically cleared after processing to reduce operation time.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. A tapping tool comprising:
    an upper body having a first end engageable by a holding structure and a second end;
    a lower body having a first end adjacent said second end of said upper body and a second end, said lower body freely manually rotatable with respect to said upper body, manually axially displaceable away from said upper body and force biased toward said upper body to enable a user to directly manually engage said lower body and gently guide said lower body toward a bore to be tapped;
    a tap chuck having a first end connected to said second end of said lower body and a second end for holding a tap, said tapping tool to enable continuous guiding of said lower body and with manual turning advance into the bore throughout a length of threaded bore formed.

2. The tapping tool as recited in claim 1 wherein said upper body further comprises:
    a tube having a first open end having a first internal threaded surface, a second open end having a second internal threaded surface;
    a base cap having an upper projection for engagement by said holding structure and a lower threaded member for engagement with said first internal threaded surface of said tube;
    a fitting having an upper threaded member for engagement with said second internal threaded surface of said tube;
    a spring compression member having a first end having an expanded head and a second end extending through said fitting and connected to said lower body; and
    a spring located within said tube having a first end urged toward said expanded head and a second end urged toward said fitting.

3. The tapping tool as recited in claim 1 wherein said tap chuck includes an upper projection extending into said lower body and secured with a set screw extending into said lower body through a set screw threaded opening.

4. The tapping tool as recited in claim 1 and further comprising at least one handle attached to said lower body to facilitate manual mechanical advantage to be applied in turning said lower body.

5. The tapping tool as recited in claim 2 wherein said spring further comprises a plurality of springs mounted co-axially.

6. A tapping tool comprising:
    an upper body having a first end engageable by a holding structure and a second end;
    a lower body having a first end adjacent said second end of said upper body and a second end, said lower body freely manually rotatable with respect to said upper body, manually axially displaceable away from said upper body and gently force biased toward said upper body;
    a socket adapter having a first end connected to said second end of said lower body and a second end for holding a tap, said force bias of said lower body enabling said lower body to lift said tap gently away from a tapped bore once said tap has completed backing out of said tapped bore.

7. The tapping tool as recited in claim 6 wherein said socket adapter further comprises a body having a central portion, an upper projection including a lateral flat portion for facilitating an axially and rotationally securing of said adapter by a force member, and a lower male socket projection member having a lateral round projection.

8. A tapping tool comprising:
    an upper body having a first end engageable by a holding structure and a second end;
    a lower body having a first end adjacent said second end of said upper body and a second end, said lower body freely manually rotatable with respect to said upper body, manually axially displaceable away from said upper body and force biased toward said upper body to enable a user to directly manually engage said lower body and gently guide said lower body toward a bore to be tapped;
    an adapter having a central portion, an upper projection connected to said second end of said lower body and a lower male socket projection member having a lateral round projection, said socket projection member for engaging a socket supported tap, said tapping tool to enable continuous guiding of said lower body and with manual turning advance into the bore throughout a length of threaded bore formed.

9. The tapping tool as recited in claim 8 wherein said upper body further comprises:
    a tube having a first open end having a first internal threaded surface, a second open end having a second internal threaded surface;
    a base cap having an upper projection for engagement by said holding structure and a lower threaded member for engagement with said first internal threaded surface of said tube;

a fitting having an upper threaded member for engagement with said second internal threaded surface of said tube;

a spring compression member having a first end having an expanded head and a second end extending through said fitting and connected to said lower body; and a spring located within said tube having a first end urged toward said expanded head and a second end urged toward said fitting.

10. The tapping tool as recited in claim 8 wherein said adapter includes an upper projection extending into said lower body and secured with a set screw extending into said lower body through a set screw threaded opening.

11. The tapping tool as recited in claim 8 and further comprising at least one handle attached to said lower body to facilitate manual mechanical advantage to be applied in turning said lower body.

12. The tapping tool as recited in claim 9 wherein said spring further comprises a plurality of springs mounted co-axially.

* * * * *